(12) United States Patent
Karubian

(10) Patent No.: US 9,615,588 B2
(45) Date of Patent: Apr. 11, 2017

(54) DEHIDING TOOL

(71) Applicant: KENTMASTER MFG. CO., INC., Monrovia, CA (US)

(72) Inventor: Ralph K. Karubian, Los Angeles, CA (US)

(73) Assignee: Kentmaster Mfg. Co., Inc., Monrovia, CA (US)

( * ) Notice: Subject to any disclaimer, the term of this patent is extended or adjusted under 35 U.S.C. 154(b) by 189 days.

(21) Appl. No.: 14/505,419

(22) Filed: Oct. 2, 2014

(65) Prior Publication Data

US 2015/0099442 A1    Apr. 9, 2015

Related U.S. Application Data

(60) Provisional application No. 61/887,297, filed on Oct. 4, 2013.

(51) Int. Cl.
 *A22B 5/16* (2006.01)
(52) U.S. Cl.
 CPC ............. *A22B 5/168* (2013.01); *A22B 5/163* (2013.01)
(58) Field of Classification Search
 CPC ......... A22B 5/163; A22B 5/165; B26B 25/00; B26D 2001/006; B26D 3/28
 USPC ............... 452/132, 133, 125, 111, 137, 149; 30/173, 265, 276, 247
 See application file for complete search history.

(56) References Cited

U.S. PATENT DOCUMENTS

| 1,531,406 | A |   | 3/1925  | Meunier            |           |
|-----------|---|---|---------|--------------------|-----------|
| 2,766,524 | A | * | 10/1956 | Dagneau ........... | A22B 5/163 |
|           |   |   |         |                    | 30/215    |
| 3,048,150 | A |   | 8/1962  | Young              |           |
| 3,165,833 | A |   | 1/1965  | Logan              |           |
| 3,176,397 | A |   | 4/1965  | Schuhmann          |           |
| 3,262,199 | A |   | 7/1966  | Magarian           |           |
| 3,587,752 | A |   | 6/1971  | Smith              |           |
| 3,852,882 | A |   | 12/1974 | Bettcher           |           |
| 3,857,177 | A |   | 12/1974 | Karubian et al.    |           |
| 4,215,451 | A | * | 8/1980  | Wikoff ........... | A22B 5/163 |
|           |   |   |         |                    | 30/206    |
| 4,368,560 | A | * | 1/1983  | Wetzel ........... | A22B 5/163 |
|           |   |   |         |                    | 30/219    |
| 4,575,938 | A |   | 3/1986  | McCullough         |           |
| 4,586,884 | A |   | 5/1986  | Berger et al.      |           |
| 4,797,074 | A |   | 1/1989  | Albert             |           |
| 4,894,915 | A |   | 1/1990  | Decker et al.      |           |

(Continued)

FOREIGN PATENT DOCUMENTS

EP    1 527 854 B1    12/2006
EP    2 497 366 A1    9/2012

(Continued)

OTHER PUBLICATIONS

PCT Search Report and Written Opinion mailed Nov. 19, 2014, for Application No. PCT/US2014/058908; 9 Pages.

(Continued)

*Primary Examiner* — Richard Price, Jr.
(74) *Attorney, Agent, or Firm* — Lewis Roca Rothgerber Christie LLP

(57) ABSTRACT

A dehider includes an elongated handle having side-by-side circular disks, one of which is stationary and the other is rotary. A pinion gear is power-driven to rotate the rotary disk.

19 Claims, 19 Drawing Sheets

(56) References Cited

U.S. PATENT DOCUMENTS

| | | | |
|---|---|---|---|
| 4,901,400 A * | 2/1990 | Karubian | B27B 19/008 30/173 |
| 5,122,092 A * | 6/1992 | Abdul | A22B 5/163 30/219 |
| 5,230,154 A | 7/1993 | Decker et al. | |
| 5,311,664 A | 5/1994 | Abdul | |
| 5,340,233 A | 8/1994 | Motl | |
| 5,441,445 A * | 8/1995 | Karubian | A22B 5/163 30/219 |
| 5,522,142 A | 6/1996 | Whited | |
| 5,551,156 A * | 9/1996 | Elmer | B26B 25/00 30/276 |
| 5,664,332 A | 9/1997 | Whited et al. | |
| 5,692,307 A | 12/1997 | Whited et al. | |
| 5,761,817 A | 6/1998 | Whited et al. | |
| 6,769,184 B1 | 8/2004 | Whited | |
| 7,163,453 B1 | 1/2007 | Gwyther | |
| 7,722,448 B2 | 5/2010 | Gwyther | |
| 8,047,901 B2 | 11/2011 | Gwyther | |
| 8,448,340 B2 | 5/2013 | Whited | |
| 8,905,827 B1 * | 12/2014 | Ross | A22B 5/163 452/133 |
| 2013/0025139 A1 | 1/2013 | Whited et al. | |
| 2013/0185944 A1 | 7/2013 | Thompson et al. | |

FOREIGN PATENT DOCUMENTS

| | | |
|---|---|---|
| GB | 686926 | 2/1953 |
| WO | WO 02/30302 A1 | 4/2002 |
| WO | WO 2006/057330 A1 | 6/2006 |
| WO | WO 2007/057979 A1 | 5/2007 |
| WO | WO 2012/107583 A1 | 8/2012 |

OTHER PUBLICATIONS

Atlas Copco Tools, "Industrial Power Tools"; pp. 1 and 155 (Specifically, Nibbler LPN33), and manual regarding LPN 33, dated 1977; 10 pages.

Baumeister, Theodore and Marks, Lionel S.; "Standard Handbook for Mechanical Engineers"; McGraw-Hill Book Company; 7th Edition; Chapter 5, pp. 91-105; 1958.

Dotco; "Parts Manual, 45-8009, PL30-1012-1, 10-12 & 12-12 Series, Right Angle Grinders/Sanders"; May 5, 2011; 4 Pages.

National Institute for Occupational Safety and Health (NIOSH); "Criteria for a Recommended Standard: Occupational Exposure to Hand-Arm Vibration"; NIOSH Publication No. 89-106; Sep. 1989; Chapters I, II and III pp. 1-30, and pp. 93-102; Chapter II.

U.S. Department of Labor, Occupational Safety and Health Administration, "Ergonomics Program Management Guidelines for Meatpacking Plants," 1993 (reprinted), OSHA 3 123, pp. 1-26.

Wilhite, Charles R.; "Pneumatic tool hand-arm vibration and posture characterization involving U.S. navy shipboard personnel"; Graduate School Theses and Dissertations of USF Graduate School, University of South Florida; Jun. 1, 2007; 68 Pages.

* cited by examiner

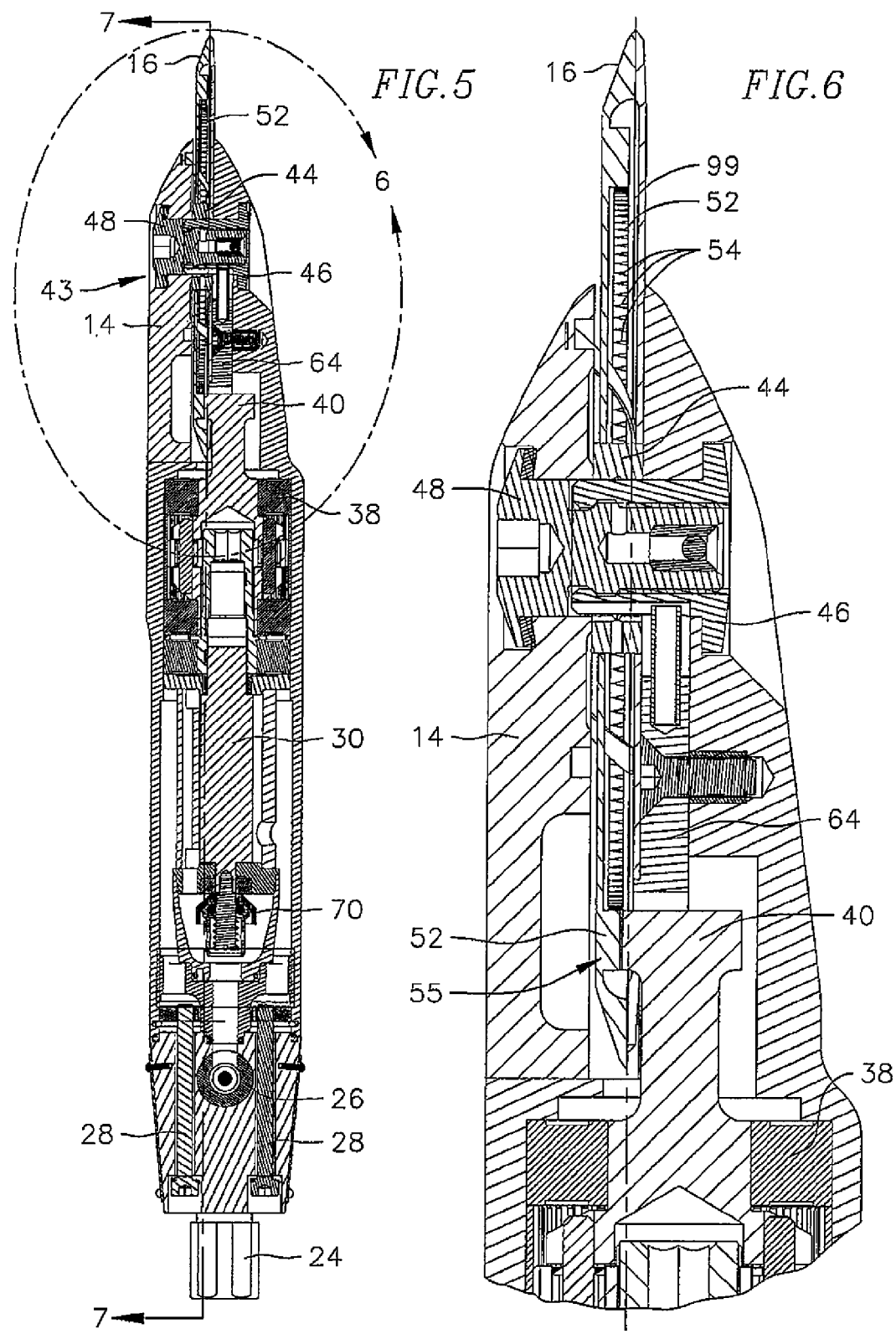

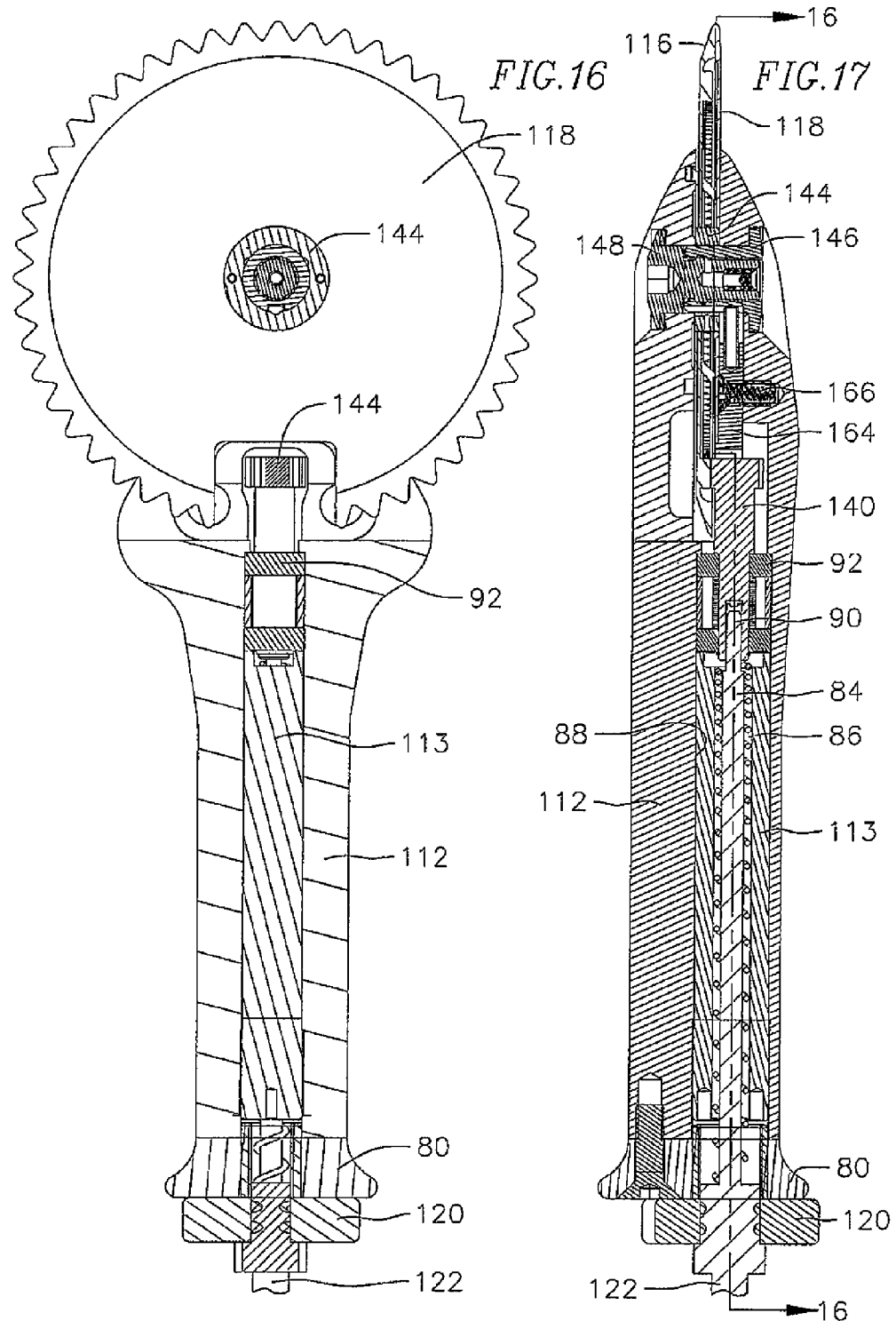

DEHIDING TOOL

CROSS-REFERENCE TO RELATED APPLICATION

This application is based upon and claims priority to and the benefit of U.S. Provisional Application No. 61/887,297, filed Oct. 4, 2013, the disclosure of which is fully incorporated herein by reference.

FIELD OF THE INVENTION

This invention relates to handheld dehiding tools used in meat processing plants for separating the hide of an animal from its carcass.

BACKGROUND

Power-operated handheld dehiders are well known in the meat processing industry. Generally speaking, these tools have oppositely reciprocating cutting blades, usually disk-shaped with serrated outer edges. The adjacent cutting disks are driven in opposite cutting oscillations, typically by a pair of oscillating pushrods connected to an eccentric drive mechanism driven by an air motor carried on the tool. As the pushrods oscillate, the teeth on one rotary disk move past the teeth on the oppositely-moving rotary disk. This produces a shearing and cutting action that separates the hide from the carcass.

Although this dehider design has proved effective in the industry for many years, various improvements have been developed over time to address certain problems that have arisen from using these dehiders. Among these problems are the noise and vibration caused by using the tool over prolonged periods of time on a production line. The oscillating nature of the eccentric-driven pushrods and the cutting blades produces substantial vibration. And excessive vibration of these handheld dehiders as well as other handheld power tools can lead to workplace hazards such as hand-arm vibration syndrome, such as carpal tunnel syndrome. These problems have been recently addressed by OSHA standards to protect workers from the ill effects of constantly using handheld vibrating power tools such as eccentric-driven dehiders.

To reduce vibration experienced with oscillating dehiders, recent design approaches have been taken. These include reducing the weight of the tool and/or counterbalancing the moving mass of the pushrods, as examples. As for dehiders in particular, the oscillating blades are driven at high speeds during use, typically at speeds in excess of 6,500 strokes per minute ("spm"). The tool tends to slow down when pressure is applied and can return to a much higher no-load speed when the cutting load is released. The no-load speed can momentarily return to at least 8,000 spm, for example. This causes worker fatigue as well as excessive vibration forces being transmitted from the handheld device. Attempts to reduce vibration have also included motor speed controls and speed governors to smooth out the accelerations that cause undue vibrations which otherwise occur during normal changes in load applied by the cutting blades during use. Examples of such speed controls are disclosed in U.S. Pat. No. 7,722,448 to Gwyther and U.S. Pat. No. 4,901,400 to Karubian.

Thus, there is an ongoing need to produce a handheld dehider that is light in weight and is essentially devoid of vibration problems caused during normal use over extended periods of time. The tool should also maintain standard cutting efficiencies and be easy to repair and operate at a reasonable cost.

SUMMARY OF INVENTION

Briefly, one embodiment of this invention comprises a handheld dehider which includes an elongated handle having a pair of side-by-side circular cutting disks at one end. The cutting disks may both have serrated cutting edges around outer circumference of each disk. A drive member such as a pinion gear contained in the handle section is power-driven to rotate one of the cutting disks while the adjacent cutting disk is maintained in a stationary position. The driven cutting disk, in one embodiment, contains a circular face gear, ring gear or bevel gear with its gear teeth located around an inside face of the disk, adjacent the stationary disk. The gear teeth are engaged by the drive member to rotate the disk adjacent to the stationary disk with a scissor-like cutting action. The dehider's rotary cutting disk can be driven by an air motor contained in the handle section, with motor speed controlled by a speed governor positioned between an air valve and the motor. In an alternate form of the invention, a similar cutting disk arrangement can be driven by a remote electric motor and a drive cable carried on the handle and engaged with the pinion gear.

The single rotating cutting edge adjacent the fixed stationary cutting edge produces an efficient scissor-like cutting action without vibration. The dehider drive mechanism avoids use of the prior art oscillating blades and eccentric-driven pushrods which have caused the vibration problems experienced in prior art dehiders.

These and other aspects of the invention will be more fully understood by referring to the following detailed description and the accompanying drawings.

BRIEF DESCRIPTION OF THE DRAWINGS

FIG. 5 is a cross sectional view taken on line 5-5 of FIG. 6 and showing components of the dehider tool assembled together.

FIG. 6 is an enlarged fragmentary cross sectional view taken within the circle 6 of FIG. 5.

FIG. 16 is a cross-sectional view of the dehider taken on line 16-16 of FIG. 17.

FIG. 17 is a cross-sectional view of the dehider taken from a view opposite to that shown in FIG. 15.

DETAILED DESCRIPTION

Figure 1:
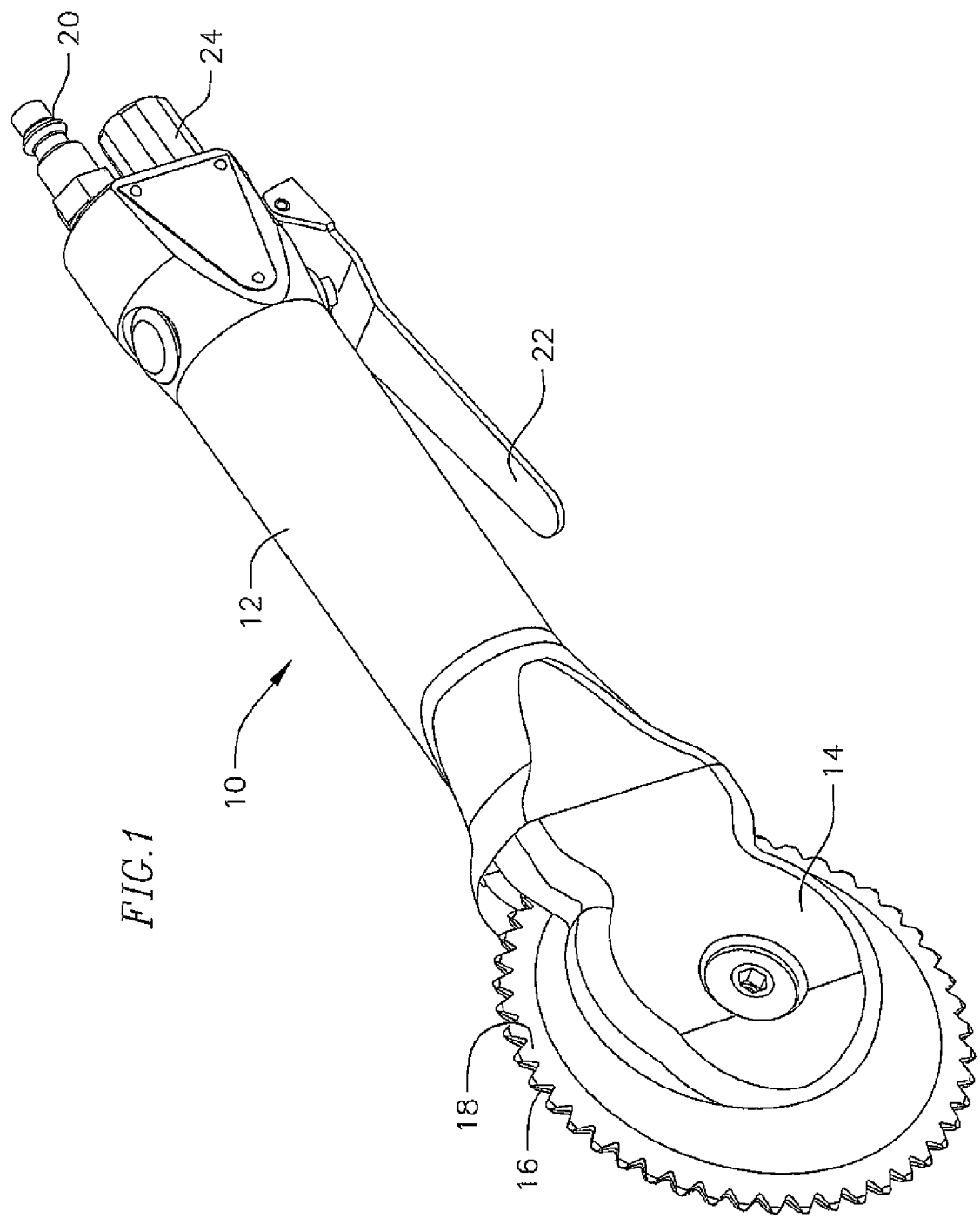
FIG. 1 is a perspective view showing a handheld air motor-driven dehider tool according to principles of this invention.

FIG. 1 is a perspective view showing an example embodiment handheld dehider tool 10 which includes an elongated handle section 12 containing an air motor and a cutting edge cover 14 affixed to the handle section above the air motor. A pair of circular cutting disks 16 and 18 each with outer edges defining cutting edges are mounted on a cutting disk shaft assembly in a cutting edge housing. The cutting disks are mounted face-to-face on the working end of the cutting edge handle. The cutting disk 16 shown on the opposite side of FIG. 1 is driven by the air motor as described in more detail below. (An alternate power source, such as an electric motor, also described below, can be used.) The other cutting disk 18 is mounted in a stationary position adjacent the rotary cutting disk 16. Each of the cutting edges of the two circular cutting disks may be serrated or not serrated. For example in one embodiment each cutting disc has a serrated cutting edge. In another example embodiment only one cutting disk has a serrated cutting edge. For example the rotary circular disk may have a serrated cutting edge whereas the stationary cutting disk has a cutting edge that is not serrated. In another example embodiment the cutting edges of both circular cutting disks are not serrated. In example embodiments, the cutting edges of the cutting disks are blade like or define a blade. The example embodiments are described herein with disks having serrated cutting edges by way of example. In yet another example embodiment, the cutting edge of the stationary circular disk is not as sharp and the cutting edge of the rotary circular disk. For illustrative purposes the embodiments are described herein with use of a stationary disk having a serrated cutting edge and a rotary disk having a serrated cutting edge.

The bottom of the handle section includes a pneumatic fitting 20 for connecting to an air inlet hose from a source of air under pressure. A normally closed air valve contained within the handle section is controlled by an exterior control lever arm 22 carried on the handle section. An exhaust fitting 24 at the bottom of the handle section directs exhaust gases away from the drive motor.

Figure 2:
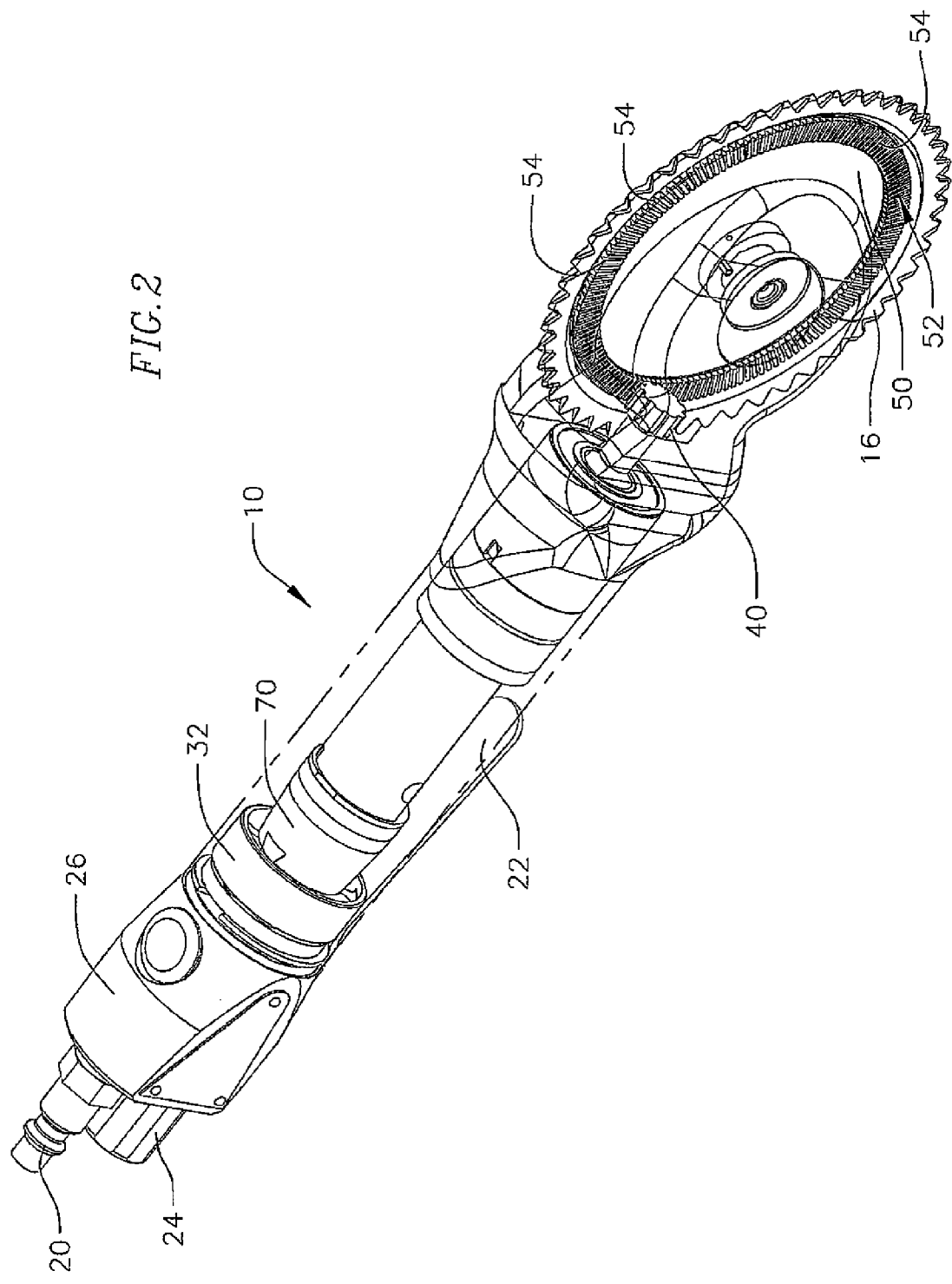
FIG. 2 is an alternate perspective view of the dehider of FIG. 1 showing internal components after having removed an outer sleeve.

FIG. 2 shows the example embodiment dehider tool having an outer sleeve and the stationary cutting disk removed, to reveal internal components of the dehider. This view shows a ring gear, bevel gear or face gear 52 on a face of the rotary cutting disk 16 driven by a drive member such as a pinion gear 40, as described in more detail below.

Figure 3:
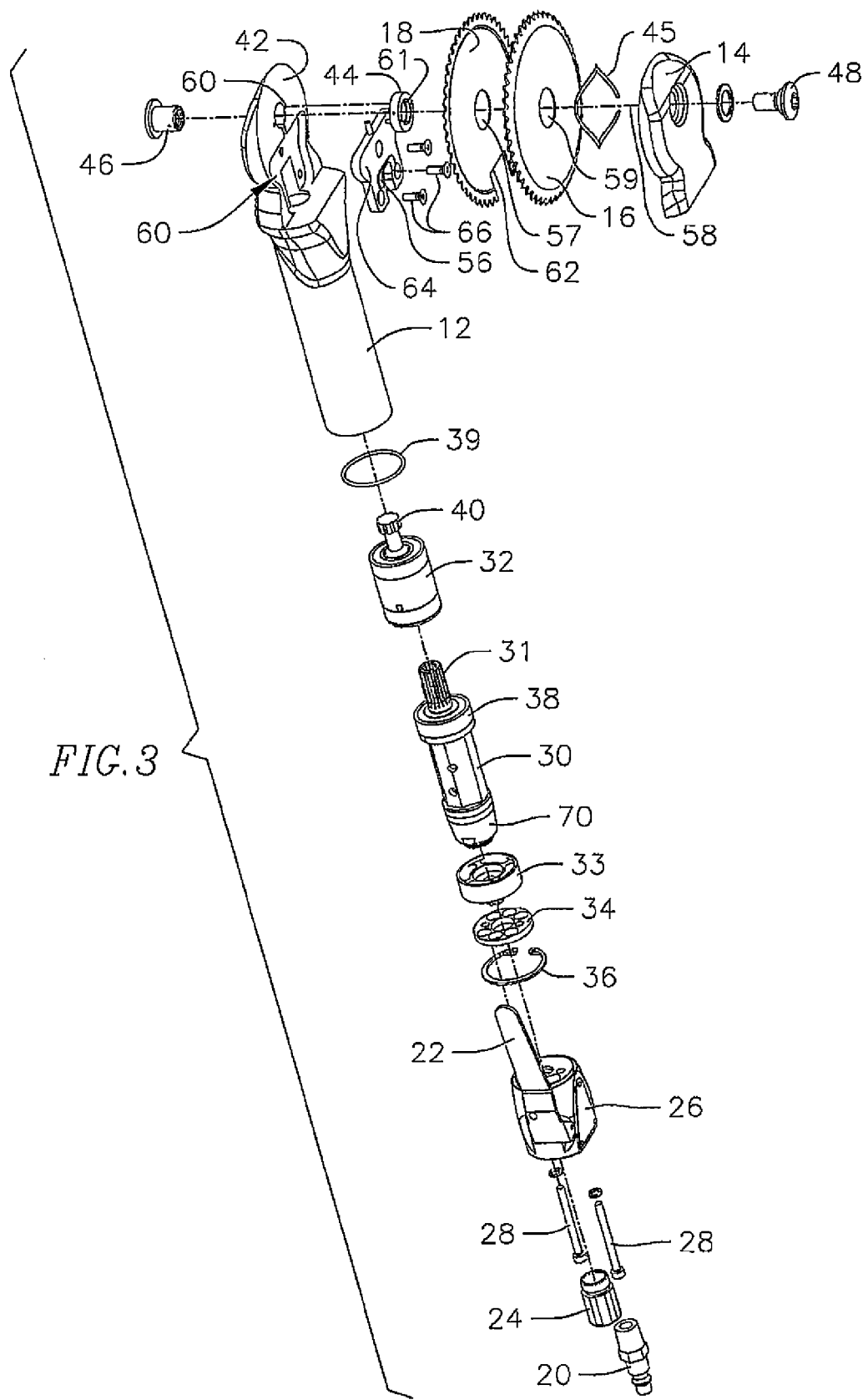
FIG. 3 is an exploded view showing components of the dehider tool from one perspective.
Figure 4:
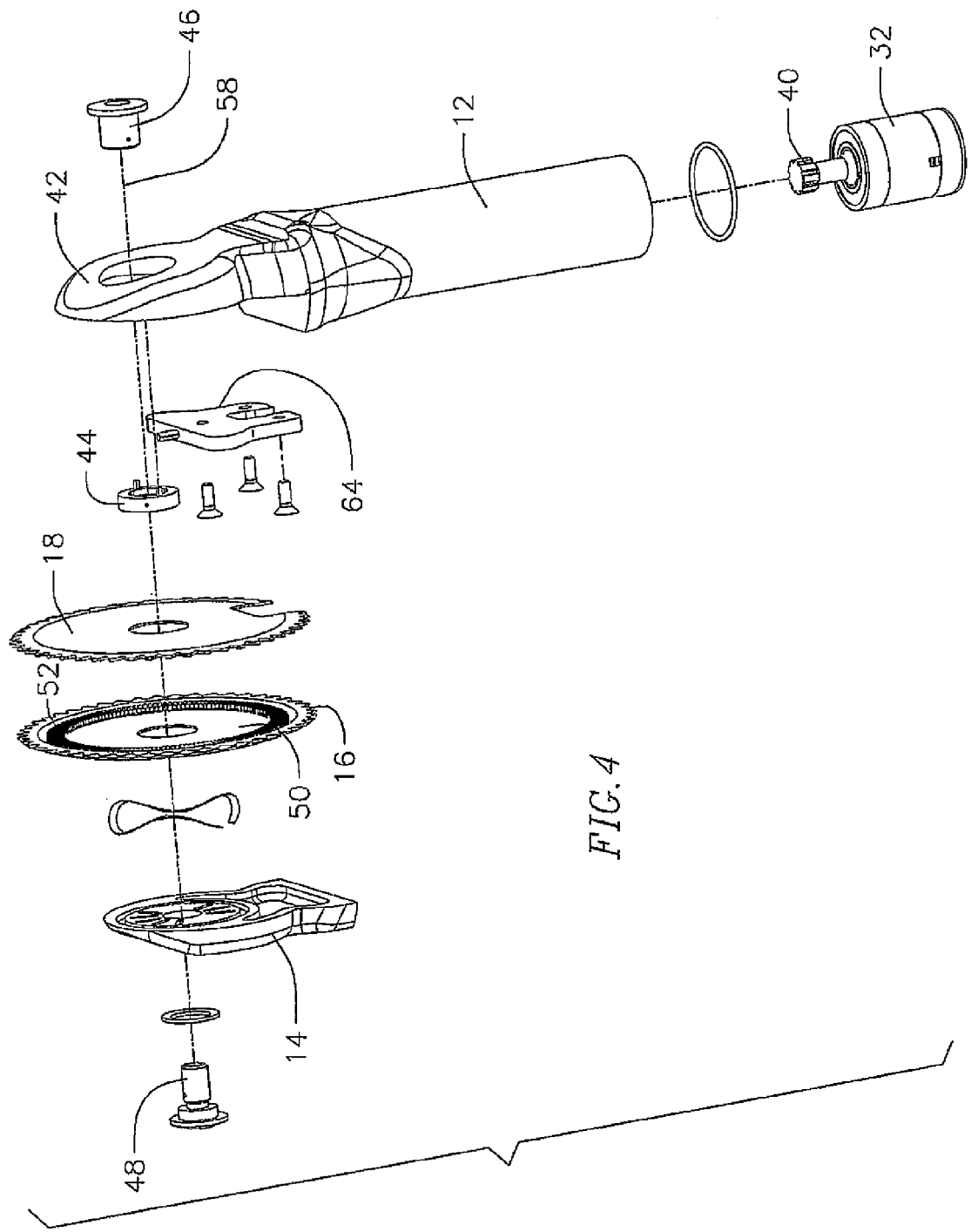
FIG. 4 is a partial exploded view of the dehider tool of FIG. 3 showing components of the tool taken from a different perspective compared to FIG. 3.

Referring to the exploded view of FIG. 3, an air valve body 26 contains an air valve that controls the flow of air to the dehider's air motor. The air valve body is fastened to the end of the handle section 12 by fasteners 28. Power for driving the rotary cutting disk 16 is provided by the air motor 30 contained in the handle section 12. The motor output shaft 31 drives a planetary gear assembly 32 engaged with a pinion gear 40. The planetary gear system provides gear reduction and torque control over the pinion gear. Also shown in FIG. 3 are a motor end cap adapter 33, a valve lock ring 34 having spaced apart air passages, and a retaining-ring 36 used in coupling the valve body to the air motor.

Figure 7:
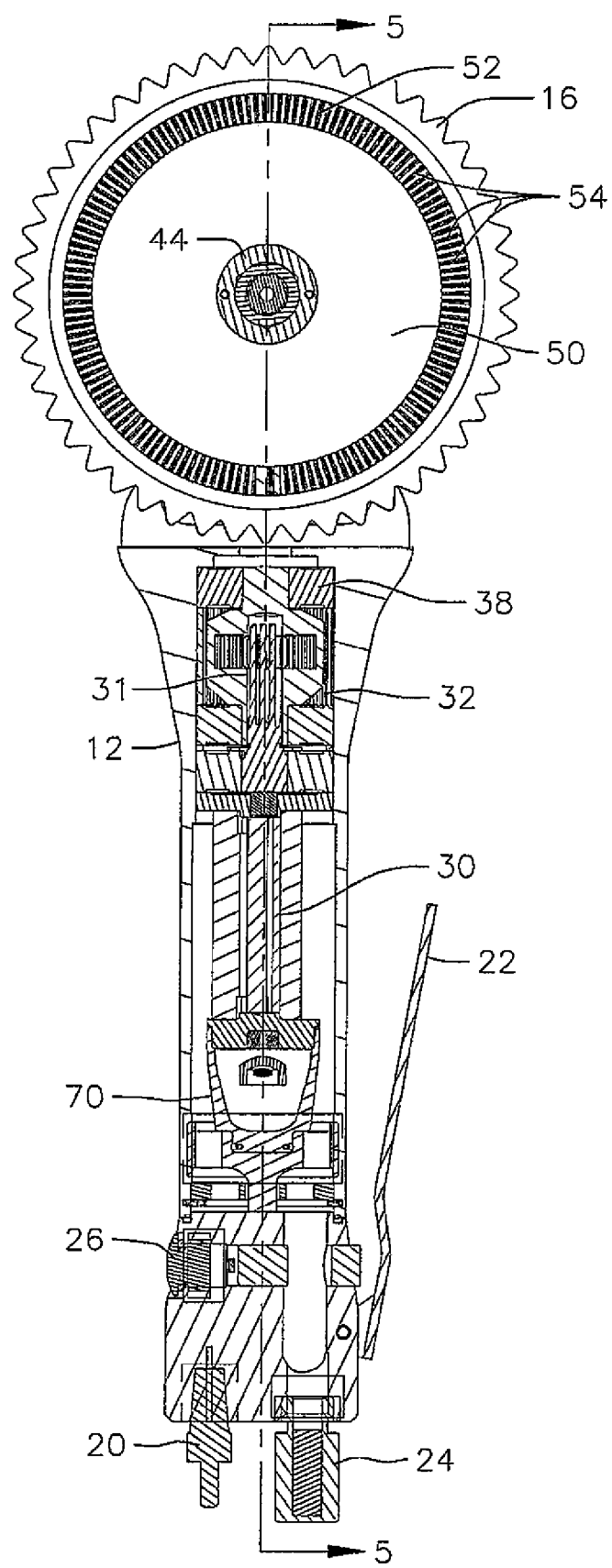
FIG. 7 is a cross sectional view of the dehider tool taken on line 7-7 of FIG. 5.
Figure 8:
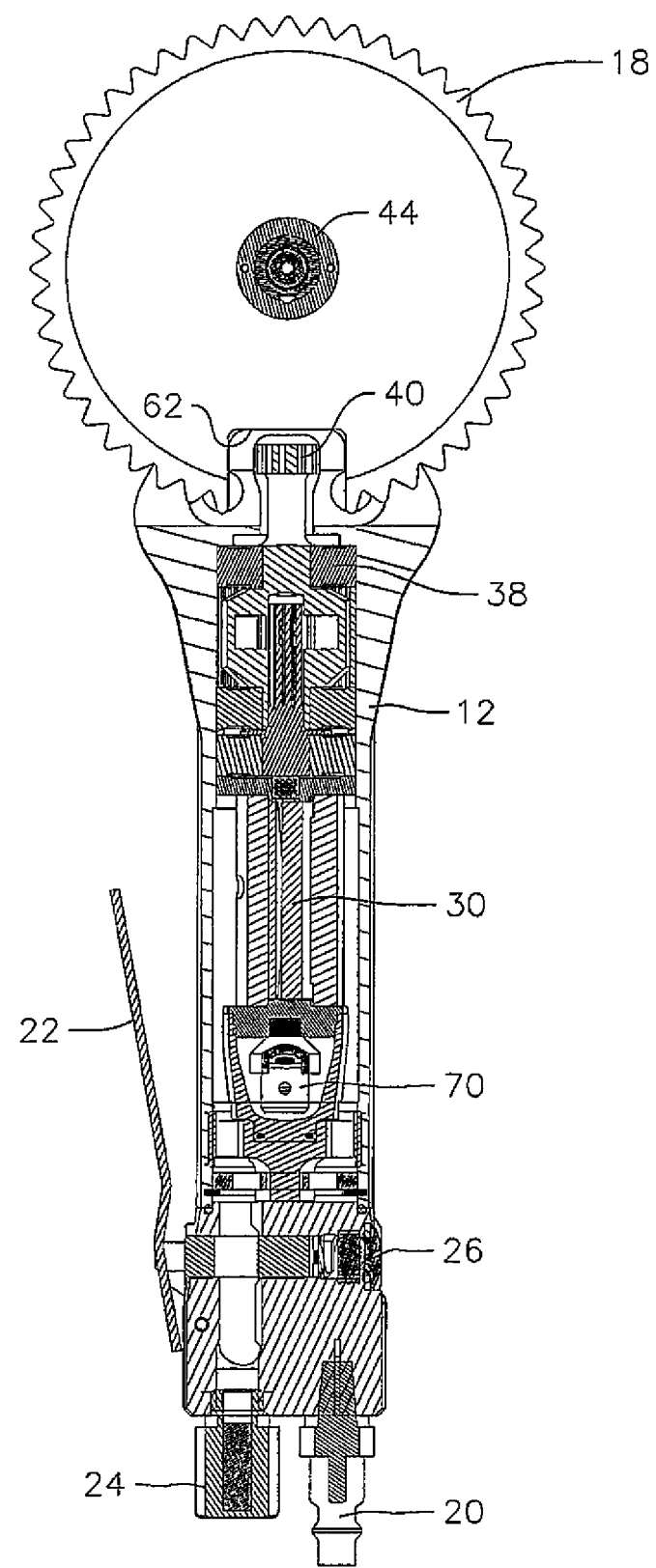
FIG. 8 is a cross sectional view of the dehider tool taken from a view opposite to that shown in FIG. 7.

As shown best in FIGS. 5, 7 and 8, the air motor 30 is supported in the handle section 12 by a ball bearing 38, also shown in FIG. 3. The planetary gear assembly 32 with pinion gear 40 is seated in the dehider housing via an O-ring 39. The air motor drives the planetary gear system which, in turn, drives the pinion gear 40 that rotates the cutting disk 16. The pinion gear 40 is one example of a drive member that can be a component of a drive mechanism or transmission for connecting the rotary power of a drive motor to the rotary-driven cutting disk 16.

The cutting disks 16 and 18 are sandwiched between a rigid end plate section 42 integral with an end of the handle 12 and the cutting edge cover plate 14. The two cutting disks are supported at their centers on a common axis by a cutting disk shaft assembly 43 which includes a spacer 44 seated between the cover plate 14 and the end plate section 42 (FIGS. 3, 4, 5 and 6). The spacer is ring member defining an opening 61. A load spring 45 is secured to the rotational axis adjacent the rotary cutting disk 16 for urging the rotary disk toward the stationary disk. The cutting edge spacer 44 is held in place between a cover insert and grease fitting (or "grease fitting") 46 at one end and a cover lock fastener 48 at the opposite end. The grease fitting 46 and the cover lock fastener 48 penetrate the opening 61 of the spacer. The spacer 44, the grease fitting 46 and the cover lock fastener form the shaft assembly 43 along an axis 58. The spacer 44 serves to space the cutting disks from the cover plate 14 and the end plate section 42. More specifically, in the example embodiment, the spacer 44 serves to space the cover plate 14 from the end plate section 42 such that they do not clamp on the cutting disks.

In an example embodiment, the rotary cutting disk 16 has a flat inside face 50 that faces toward the adjacent stationary disk 18. In other example embodiments, the inside face 50 is not flat. For example, it may have a concave curvature. The rotary cutting disk 16 is driven by its connection to the pinion gear 40 which, in turn, is driven by the air motor 30. The rotary cutting disk 16 has an annular gear 52, as for example, a ring gear, a bevel gear, or a face gear formed by a gear teeth 54 extending along a circular path around the inside face of the rotary cutting disk, immediately inside its outer serrated cutting edge. The gear teeth on the pinion gear engage the gear teeth 54 on the gear 52 so that operation of the air motor drives the pinion to rotate the cutting disk 16 via the connection to the gear 52.

A rigid frame cover 64 secured to an inside face of the end plate 42 by fasteners 66 (FIGS. 3, 4, 5 and 6). A U-shaped projection 56 extends from a face of the rigid frame cover 64 facing away from the end plate section 42. The stationary disk also has a recessed or notched region 62 at its base to provide a space for receiving the pinion gear 40 such that the pinion gear accesses the gear teeth 54 on the rotary cutting disk. The U-shaped projection 56 is also received in the stationary disk notched region 62 and it is straddled by the notched region 62. The U-shaped projection is sized so as to prevent any rotation, or any significant notched, of the stationary disk about the axis 58. The stationary disk 18 is axially held in its stationary position adjacent the rotary cutting disk 16 by the grease fitting 46 and a cover lock fastener 48 which penetrate central openings 57, 59 of the stationary and rotary disks, respectively, as well as the opening 61 of the spacer 44. The spacer 44 also penetrates the central openings 57, 59 of the stationary and rotary disks, respectively. The stationary cutting disk is supported in its fixed upright position adjacent a rigid frame cover 64 secured to an inside face of the end plate 42 by fasteners 66. The stationary cutting disk may be completely stationary or in an example embodiment may have some minimum play as for example a minimum rotational play about the axis 58.

Thus, the two cutting disks are mounted at the end of the handle with the rotary cutting disk adapted to be driven by the air motor's connection to the ring gear on the cutting disk 16, while the cutting disk 18 is held in its stationary position adjacent to the rotary cutting disk. The two cutting disks in the example embodiment have matching diameters and are mounted concentric to one another so that the serrated outer cutting edge edges of the two disks are closely spaced and face one another. In one embodiment, the two cutting disks each have a 110 mm diameter with 48 cutting teeth around the cutting edge, although other sized disks can be used. The mounting arrangement for the two disks enables a shearing and cutting action applied to the carcass of an animal when the cutting disk 16 has its cutting edge rotating adjacent to the serrated cutting edge of the adjacent stationary cutting disk. The single rotary cutting edge adjacent the stationary cutting edge avoids vibration problems caused by the eccentric-driven oscillating cutting blades of prior art dehiders.

In one embodiment, illustrated best in FIGS. 5, 7 and 8, the dehider includes a speed governor 70 positioned in the handle section and connected between the air inlet and the air motor. During use, the speed governor automatically controls the flow of pressurized air from an air inlet to the motor to maintain a desired rotational speed for the motor. The speed governor smooths out the loads applied during use and adds a further level of vibration prevention by avoiding sudden no-load forces. Although various types of speed governors could be used, it is preferred that the speed governor comprises one that operates by centrifugal force to restrict the flow of air to the motor to decrease motor speed when it exceeds a desired rotational speed. The governor includes a governor spring for biasing a valve away from a valve seat (to increase flow) and a movable mass that compresses the governor spring toward the valve seat (to restrict flow). The speed governor may be of the type that maintains the rpm of the rotary disk at a constant level which may be the same constant level when the dehider is being used to remove a hide and when the dehider is operating freely without being engaged onto a hide or other object. In other words, in an example embodiment, the governor may maintain a constant rpm of the rotary disk at the same constant level when the disks are loaded or unloaded.

Figure 9:
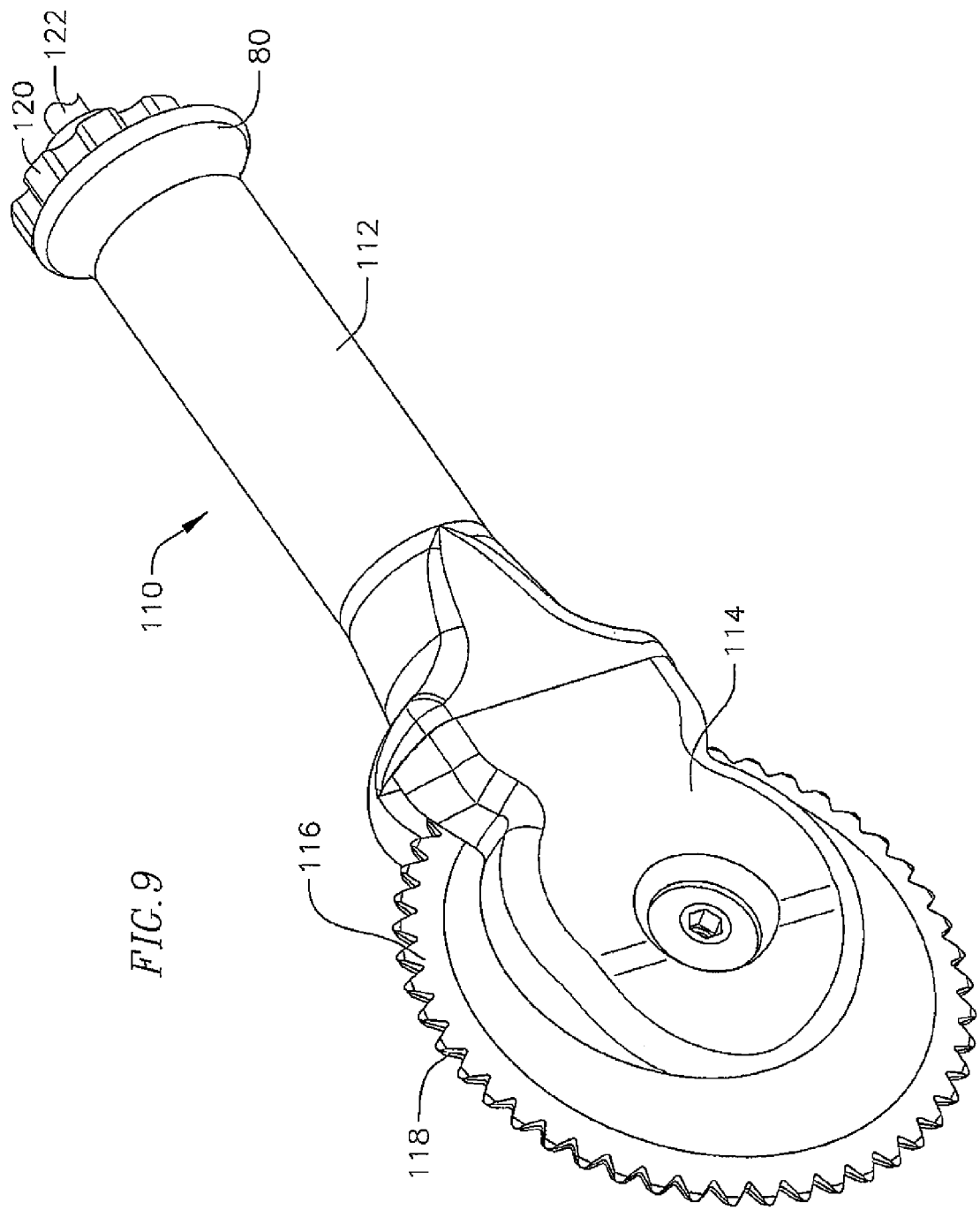
FIG. 9 is a perspective view showing an alternative form of the invention which comprises a handheld electric motor-driven dehider tool according to principles of the invention.

FIG. 9 is a perspective view showing an electric motor-driven handheld dehider tool 110 which includes an elongated handle section 112 that holds an edge cover 114 affixed to the handle section adjacent a pair of circular cutting disks 116 and 118. The cutting disks shown in FIG. 9 are mounted to the end of the handle section in a face-to-face relation similar to the cutting disks 16 and 18 described previously. In the embodiment shown in FIG. 9, the cutting disk 116 is a rotary disk, the disk 118 is stationary, and the rotary cutting disk 116 is driven by an electric motor described in more detail below. In the embodiment illustrated in FIG. 9, the electric motor-driven dehider includes a cable quick-disconnect fitting 120 and a flexible power cable 122 extending from the electric motor used to drive the rotary disk 116.

Figure 10:
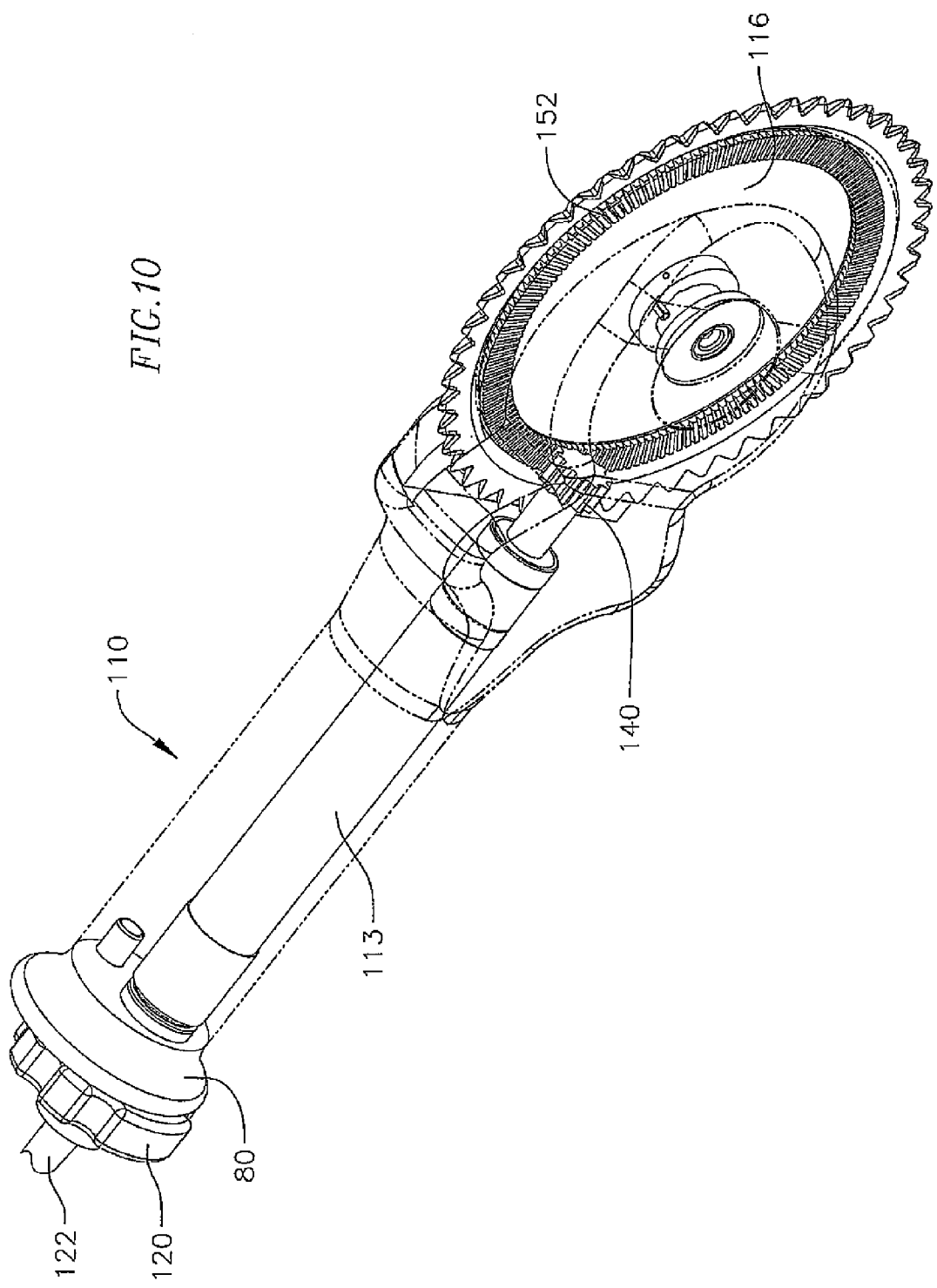
FIG. 10 is an alternate perspective view of the dehider in FIG. 9 showing internal components after having removed an outer sleeve.

FIG. 10 shows the electric motor-driven dehider having the outer cover 112 of the handle section removed to reveal internal drive components including an elongated handle bushing 113 and a pinion gear 140 engaged with a ring gear, bevel gear or face gear 152 on a face of the rotary cutting disk 116.

Figure 11:
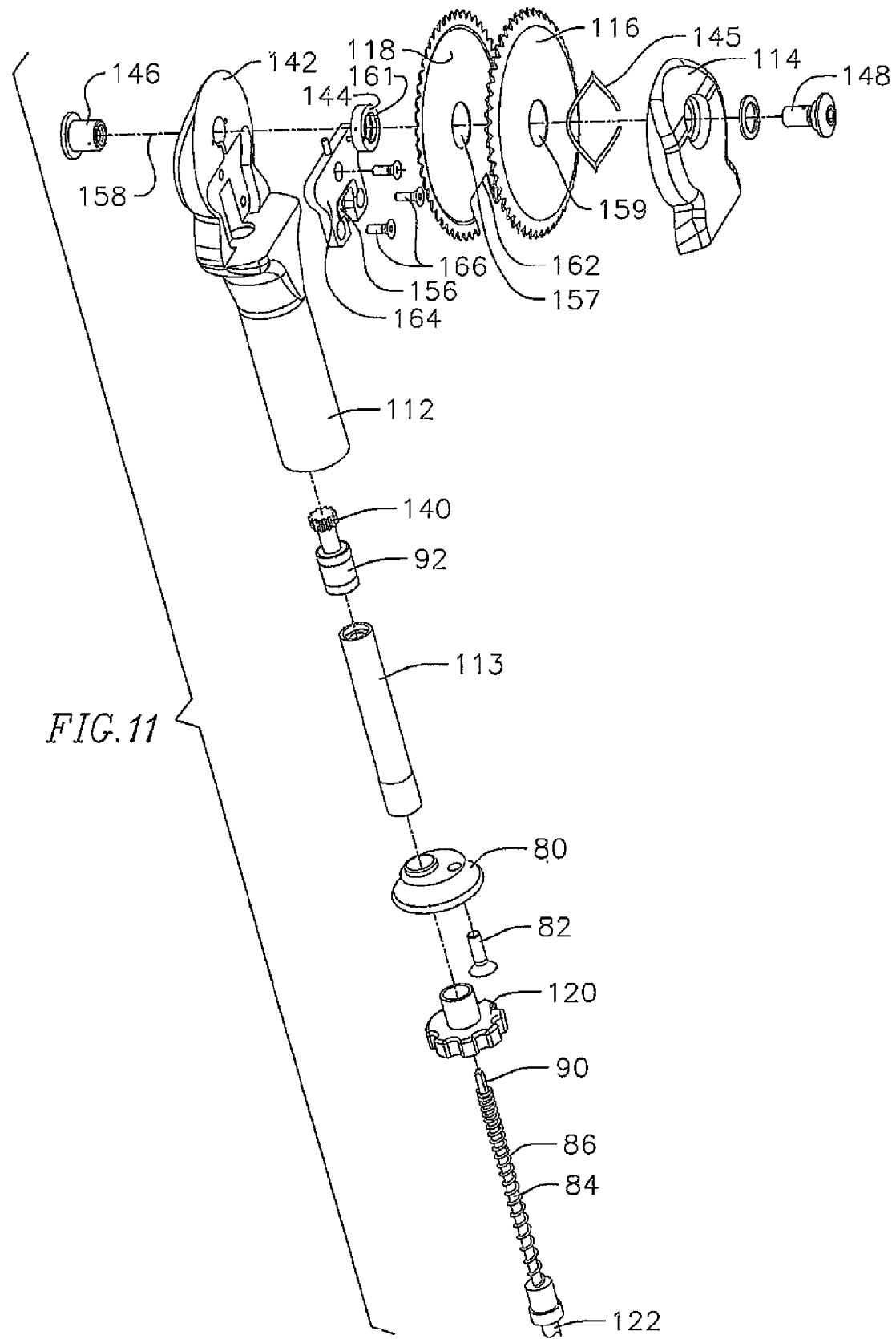
FIG. 11 is an exploded view showing components of the electric motor-driven dehider from one perspective.

Referring to the exploded view of FIG. 11, power for driving the rotary disk 116 is provided by a remote electric drive motor (not shown) coupled to the dehider by the flexible power cable 122. The power cable is detachably coupled to the terminal of the handle section by a quick-disconnect cable connector 120. The disconnect fitting is secured to a handle end cap 80 at the base of the handle section by a fastener 82. The electric motor drives an elongated flexible drive cable 84 positioned inside the bushing 113. The driven end of the flexible drive cable 84 is coupled to the pinion gear 140. A flexible cable jacket 86 in the form of a coiled sheet metal liner is sealed around the exterior of the flexible drive cable 84. The jacket carries a lubricant for the drive cable.

Figure 12:
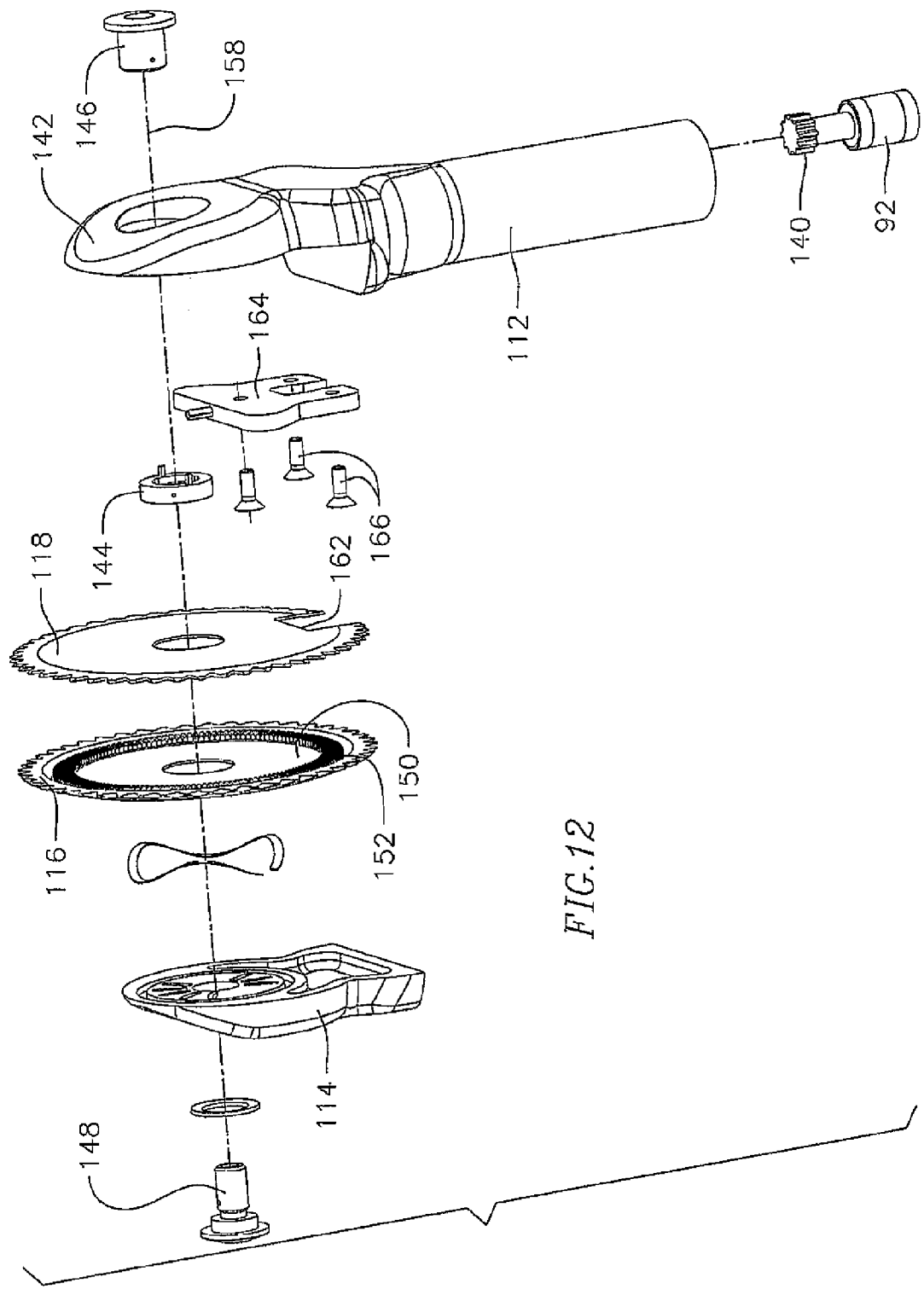
FIG. 12 is a partial exploded view of the dehider tool of FIG. 11 showing components of the tool taken from a different perspective compared to FIG. 11.
Figure 13:
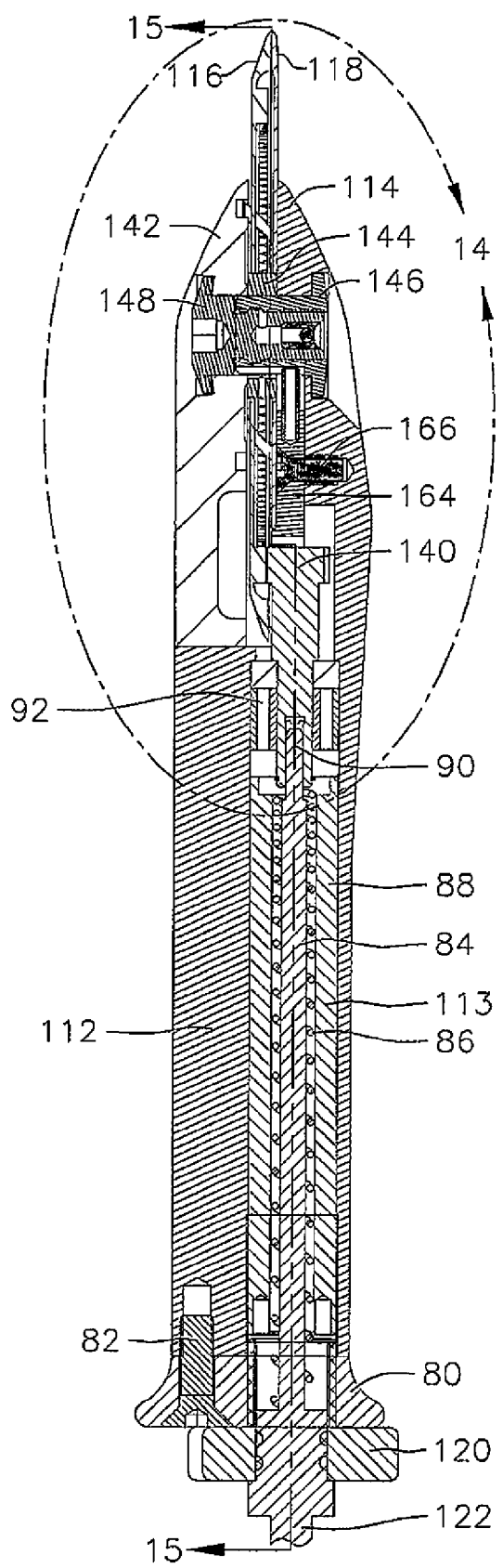
FIG. 13 is a cross-sectional view showing components of the electric motor-driven dehider tool assembled together.
Figure 14:
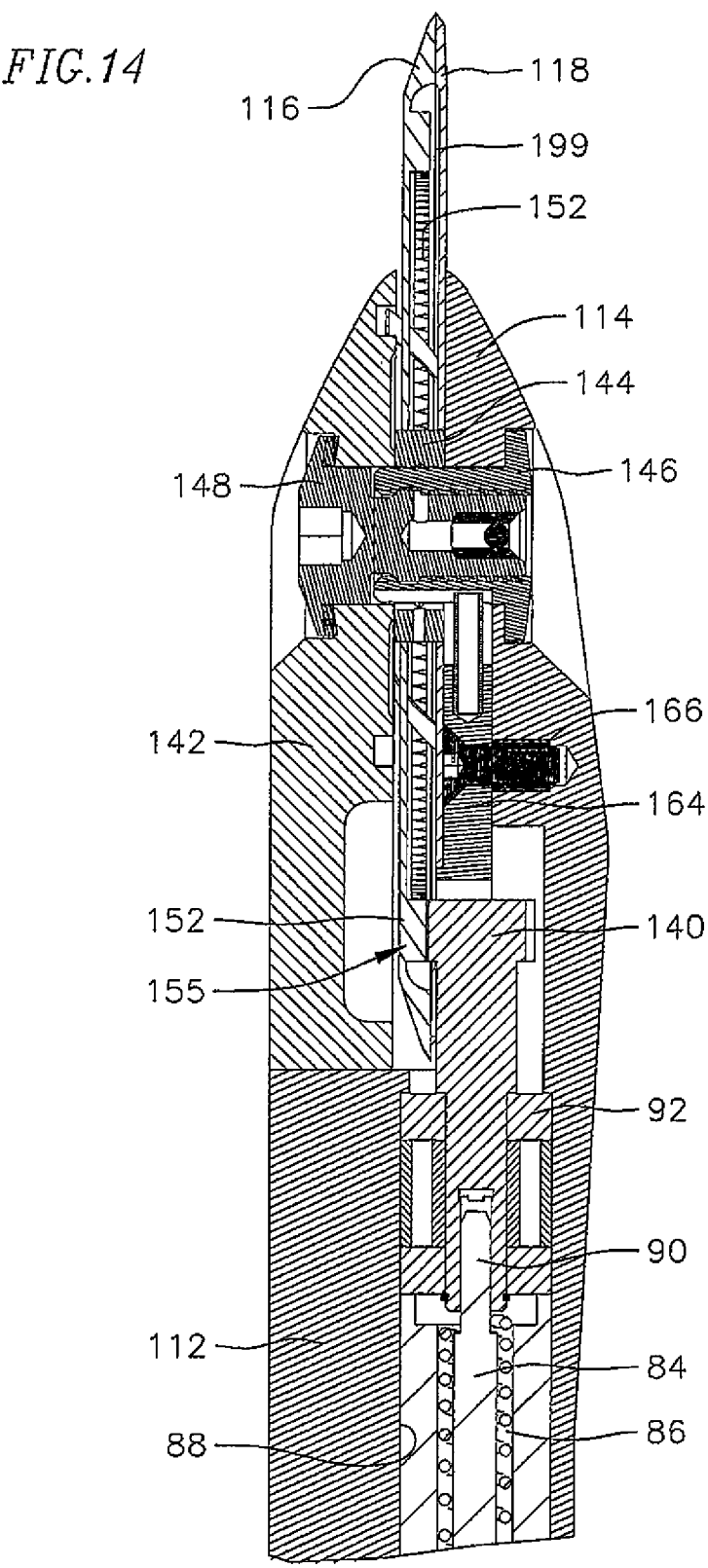
FIG. 14 is an enlarged fragmentary cross-sectional view taken within the circle 14 of FIG. 13.
Figure 15:
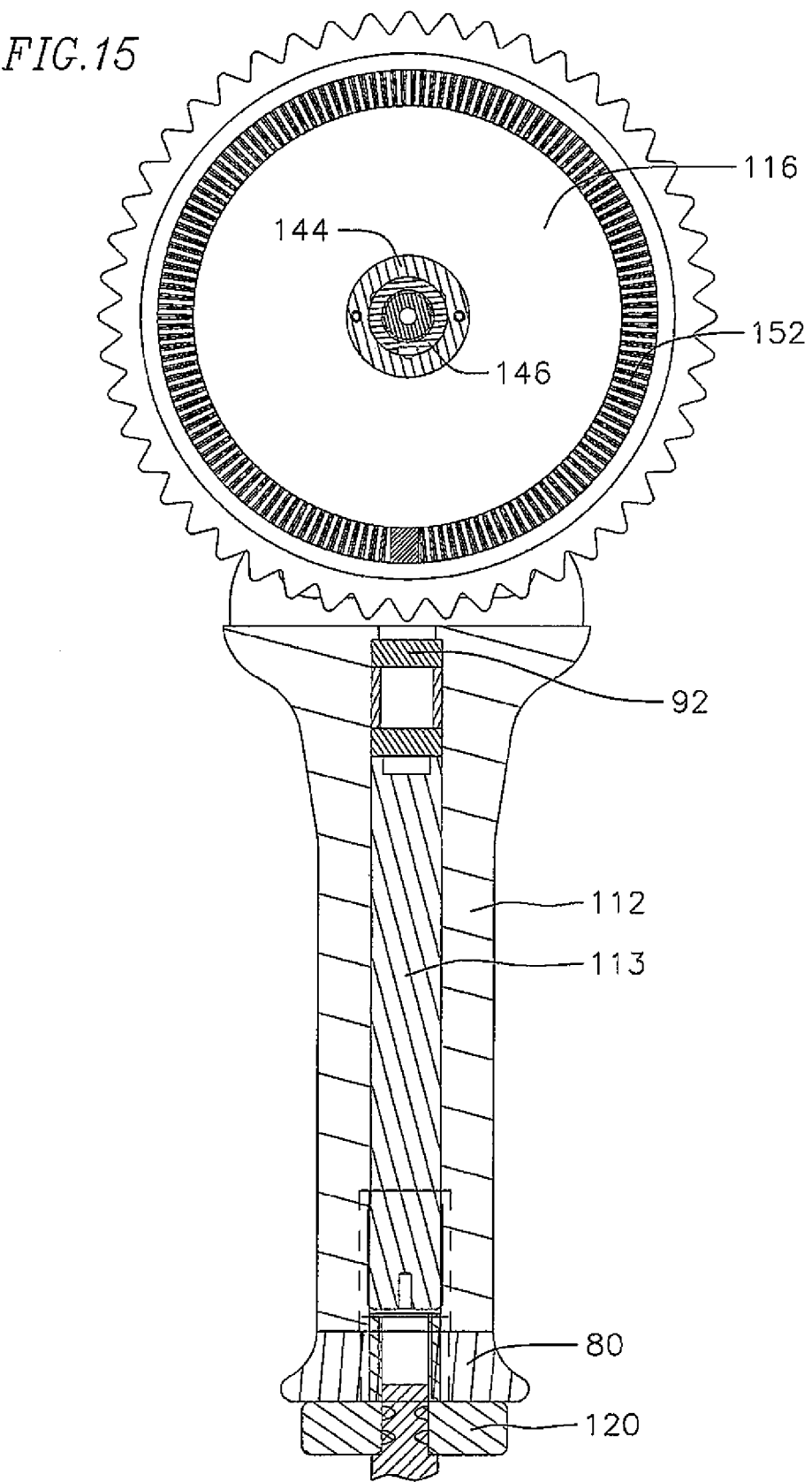
FIG. 15 is a cross-sectional view of the dehider taken on line 15-15 of FIG. 13.

Referring to the top of FIG. 11, along with the exploded view of FIG. 12, the cutting disks 116 and 118 are mounted to the end of the handle section 112 similar to the air motor embodiment described previously. A load spring 145 is secured to the rotational axis adjacent the rotary disk 116 for urging the rotary disk toward the stationary disk.

The cutting disks are sandwiched between a rigid end plate section 142 on the end of the handle 112 and a cover plate 114. The disks are supported at their centers on a common axis 158 by a cutting disk shaft assembly which includes an edge spacer 144 seated between the cover plate 114 and end plate section 142. The spacer 144 is a ring member defining a central opening 161. The spacer is held in place between a cover insert and grease fitting (or "grease fitting") 146 at one end and a cover lock fastener 148 at the opposite end. The grease fitting 146 and the cover lock fastener 148 penetrate the opening 161 of the spacer 144.

In an example embodiment, the rotary cutting disk 116 has a flat inside face 150 that faces toward the adjacent stationary disk 118. In other example embodiments, the inside face 150 is not flat. For example, it may have a concave curvature. The rotary disk 116 is driven by the pinion gear 140 which, in turn, is driven by the drive cable 84. The rotary disk 116 has an annular gear 152, as for example, a ring gear, a bevel gear or a face gear formed by the gear teeth that extend around a circular path on the inside face of the disk. The gear teeth on the pinion gear engage the gear teeth on the annular gear 152 so that operation of the electric motor-driven cable 84 drives the pinion to rotate the cutting disk by the connection to the gear 152.

A rigid frame cover 164 secured to an inside face of the end plate 142 by fasteners 166 (FIGS. 11, 12, 13 and 14). A U-shaped projection 156 extends from a face of the rigid frame cover 164 facing away from the end plate section 142. The stationary disk also has a recessed or notched region 162 at its base to provide a space for receiving the pinion gear 140, such that the pinion gear accesses the gear teeth 154 on the rotary cutting disk. The U-shaped projection 156 is also received in the stationary disk notched region 162 and it is straddled by the notched region 162. The U-shaped projection is sized so as to prevent any rotation, or any significant rotation, of the stationary plate about the axis 158. The stationary disk 118 is axially held in its stationary position adjacent the rotary cutting disk 116 by the grease fitting 146 and a cover lock fastener 148 which penetrate central openings 157, 159 of the stationary and rotary disks, respectively, as well as the opening 161 of the spacer 144. The spacer 144 also penetrates the central openings 157, 159 of the stationary and rotary disks, respectively. The stationary cutting disk is supported in its fixed upright position adjacent a rigid frame cover 164 secured to an inside face of the end plate 142 by fasteners 166. The stationary cutting disk may be completely stationary or in an example embodiment may have some minimum play as for example a minimum rotational play about the axis 158.

Similar to the cutting disks described previously for the air motor-driven embodiment, the two cutting disks 116 and 118 in an example embodiment have matching diameters and are mounted concentric to one another so that the serrated outer edge edges of the two disks are closely spaced and face one another. And in the electric motor-driven embodiment, the two disks preferably have a 110 mm diameter with 48 cutting teeth around the edge edges, although other sized disks can be used.

FIGS. 13-17 show views taken from different sides of the electric motor-driven dehider, and in particular, the flexible drive cable and its operative connection from the motor to the pinion gear 140. The electric motor in one embodiment can be a high speed, approximately 5000 rpm, AC single phase electric motor. The motor has sufficient power and torque with speed in the range necessary to produce a required cutting edge speed for the dehider. The air motor described previously, on the other hand, can operate at about 20,000 rpm, and so the planetary gear reduction module is used to reduce speed to about 5000 rpm, while increasing torque to a sufficient level to accommodate the dehiding tasks. The electric motor-driven tool can be operated within the desired speed range by a direct connection between the rotating drive cable 84 and the pinion gear 140.

During use, the electric motor can be stationed remotely above ground adjacent the production line. The electrical power from the drive motor rotates the drive cable 84 about its axis. The drive cable is centered in the tubular jacket 86 and both extend axially along a tubular passageway 88 within the handle section. The passageway is preferably offset and parallel to the central axis of the handle section, as shown best in FIGS. 13, 14, and 17. The driven end of the drive cable includes a square-shaped drive shaft 90 centered in a cooperating square shaped hole in the pinion gear 140. The driven end of the drive cable 84 is centered by a bearing 92 seated in the tubular passageway 88 in the handle section of the tool.

With the example embodiments shown in FIGS. 1 to 17 the area 55, 155 (FIGS. 6 and 14), where the pinion gear engages the annular gear 52, 152, is well within the tool and shielded from exposure to bone chips, meat and/or fat. Exposure of the gears to bone chips, meat and/or fat can disrupt the operation of the dehider and may also cause damage and/or failure to the dehider. In addition, with these embodiments, the annular gear 52, 152 is within the pocket 99, 199, defined between the disks, which receives grease via the grease fitting 46, 146, and thus is properly lubricated.

Figure 18:
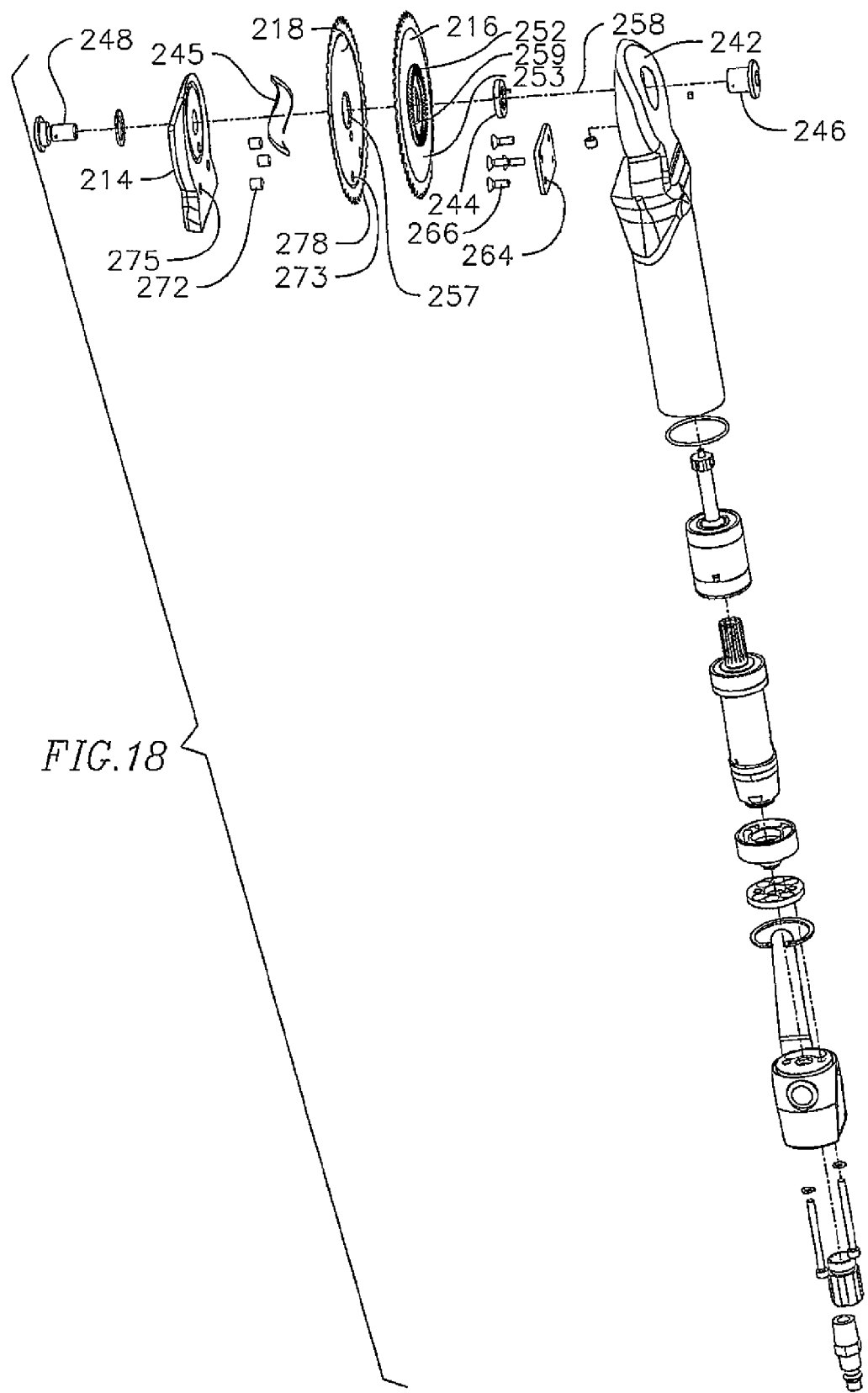
FIG. 18 is an exploded view showing components of another example embodiment dehider.
Figure 19:
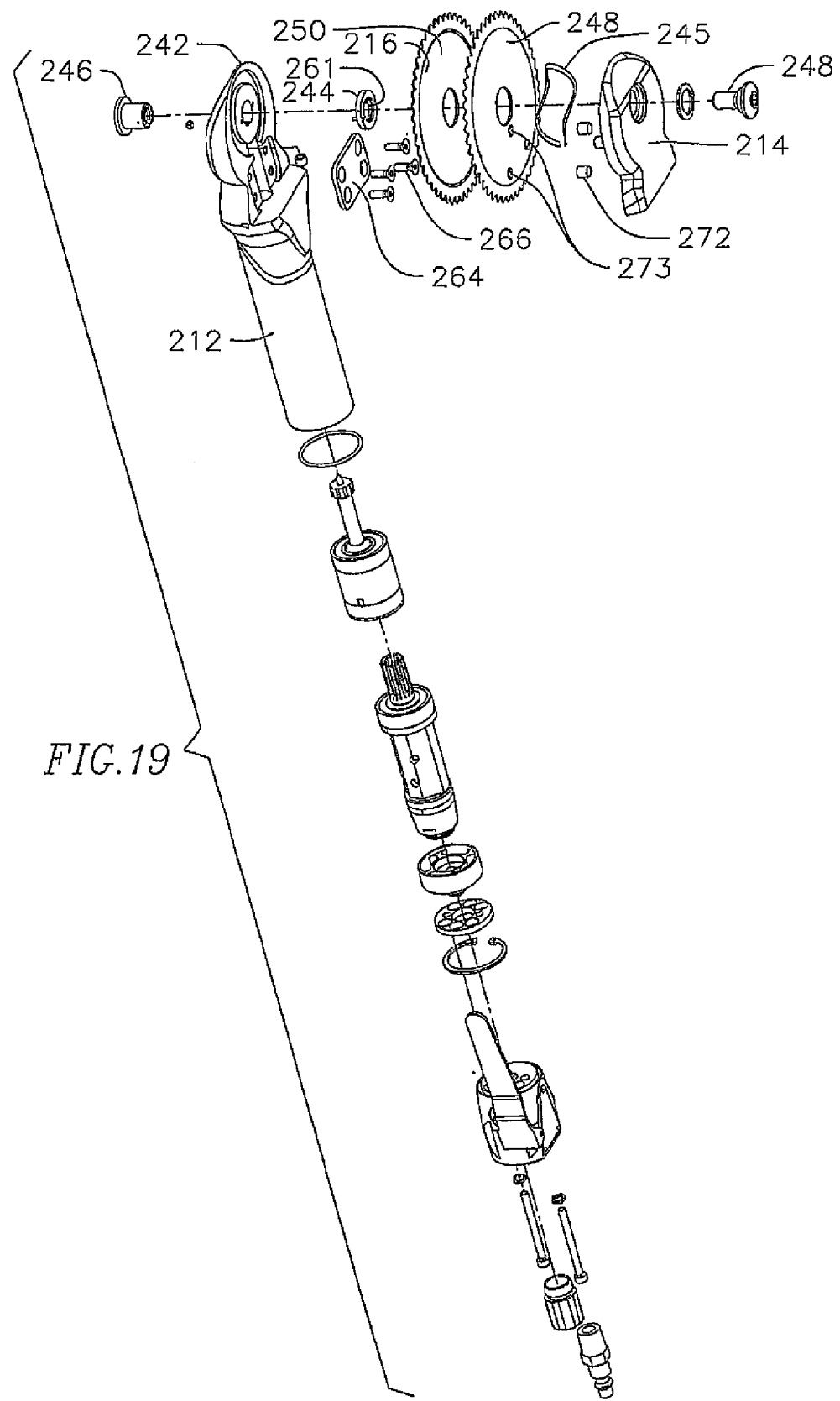
FIG. 19 is an exploded view of the dehider tool of FIG. 18 showing components of the tool taken from a different perspective compared to FIG. 18.
Figure 20:
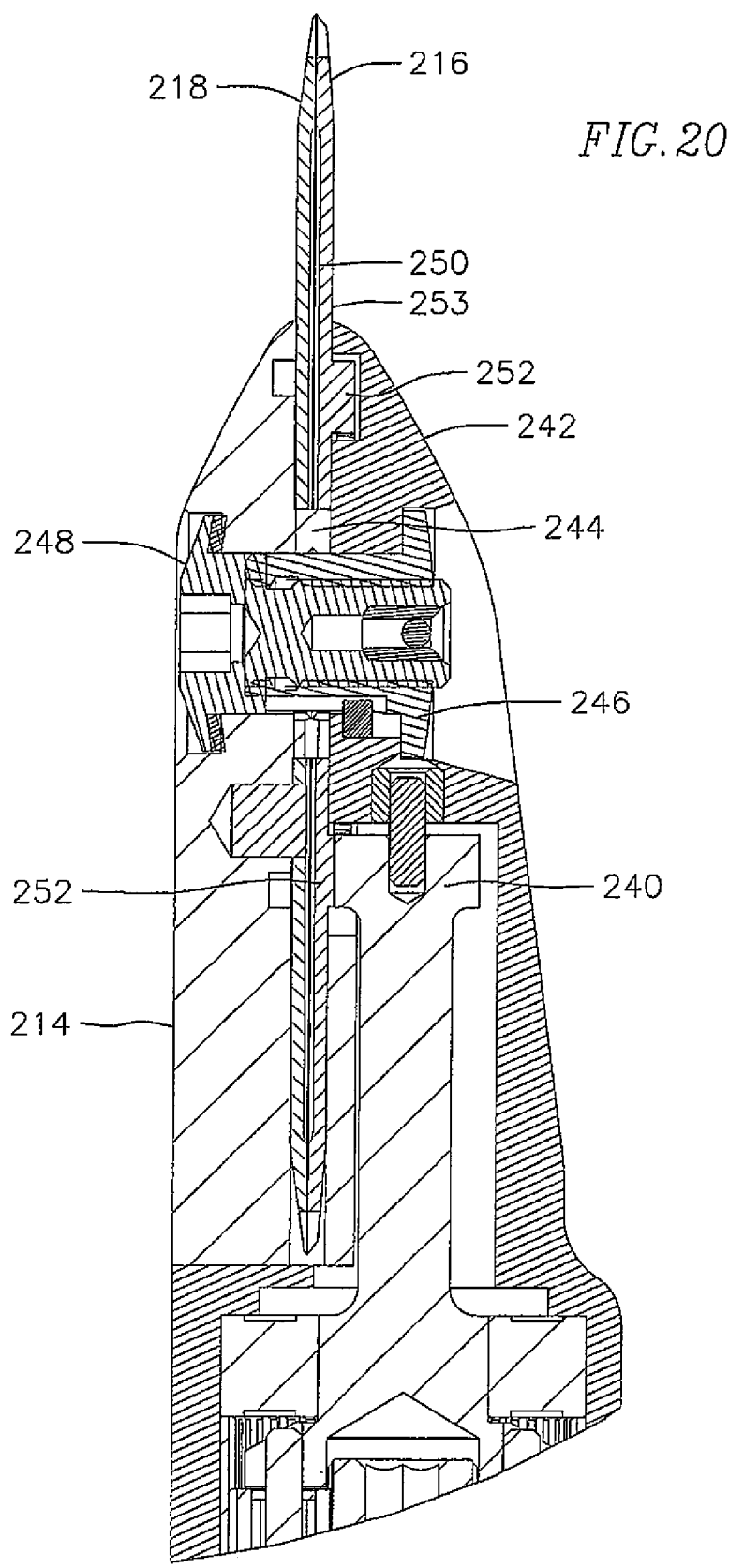
FIG. 20 is a partial cross-sectional view of the dehider tool shown in FIG. 18.

Referring to the top of FIG. 18, along with the exploded view of FIG. 19 and partial cross-sectional view of FIG. 20, in another example embodiment, cutting disks 216 and 218 are mounted to the end of the handle section 212. This example embodiment may also be driven in various exemplary embodiments pneumatically or electrically as described with the previous embodiments, or may be driven by other drive mechanisms. A load spring 245 is secured to the rotational axis adjacent the stationary disk 218 for urging the stationary disk toward the rotary disk 216.

The cutting disks are sandwiched between a rigid end plate section 242 on the end of the handle section 212 and a cover plate 214. In this embodiment, however, the rotary disk is closest to the handle section 212 whereas the stationary disk 218 is closest to the cover plate 214. The disks are supported at their centers on a common axis 258 by a cutting disk shaft assembly which includes an edge spacer 244 seated between the handle plate end section 212 and cover plate 214. The spacer 244 is a ring member defining a central opening 261. The spacer is held in place between a cover insert and grease fitting (or "grease fitting") 246 at one end and a cover lock fastener 248 at the opposite end. The grease fitting 246 and the cover lock fastener 248 penetrate the opening 261 of the spacer 244.

In an example embodiment, the rotary cutting disk 216 has a flat inside face 250 that faces toward the adjacent stationary disk 218. In another example embodiment, the inside face 250 is not flat. For example it may have a concave curvature. The rotary disk 216 has an annular gear 252, as for example, a ring gear, a bevel gear or a face gear formed by the gear teeth that extend around a circular path on an outside face 253 of the disk. The gear teeth on the pinion gear engage the gear teeth of the annular gear 252 so that the pinion gear 250 rotate can rotate the cutting disk by the connection to the gear 252.

A rigid frame cover 264 secured to an inside face of the end plate 242 by fasteners 266 (FIGS. 18 and 19). The stationary disk 218 is prevented from rotating by pins 272 extending from the cover plate 214 which penetrated corresponding openings 273 formed on the stationary disk. In an example embodiment, the pins are also fitted in openings 275 in the cover plate 214. The pins 272 fit tightly into the openings 273 and 275 so as to prevent rotation and minimize rotational play of the stationary disk. In other example embodiments the pins may be attached or integrally formed with either the cover plate or the stationary disk and penetrate the corresponding openings on the other of the cover plate and the stationary disk. Moreover the stationary disk is also axially held in its stationary position adjacent the rotary cutting disk 216 by the grease fitting 246 and a cover lock fastener 248 which penetrate central openings 257, 259 of the stationary and rotary disks, respectively, as well as the opening 261 of the spacer 244. The spacer 244 also penetrates the central openings 257, 259 of the stationary and rotary disks, respectively. The stationary cutting disk may be completely stationary or in an example embodiment may have some minimum play as for example a minimum rotational play about the axis 258.

Figure 21:
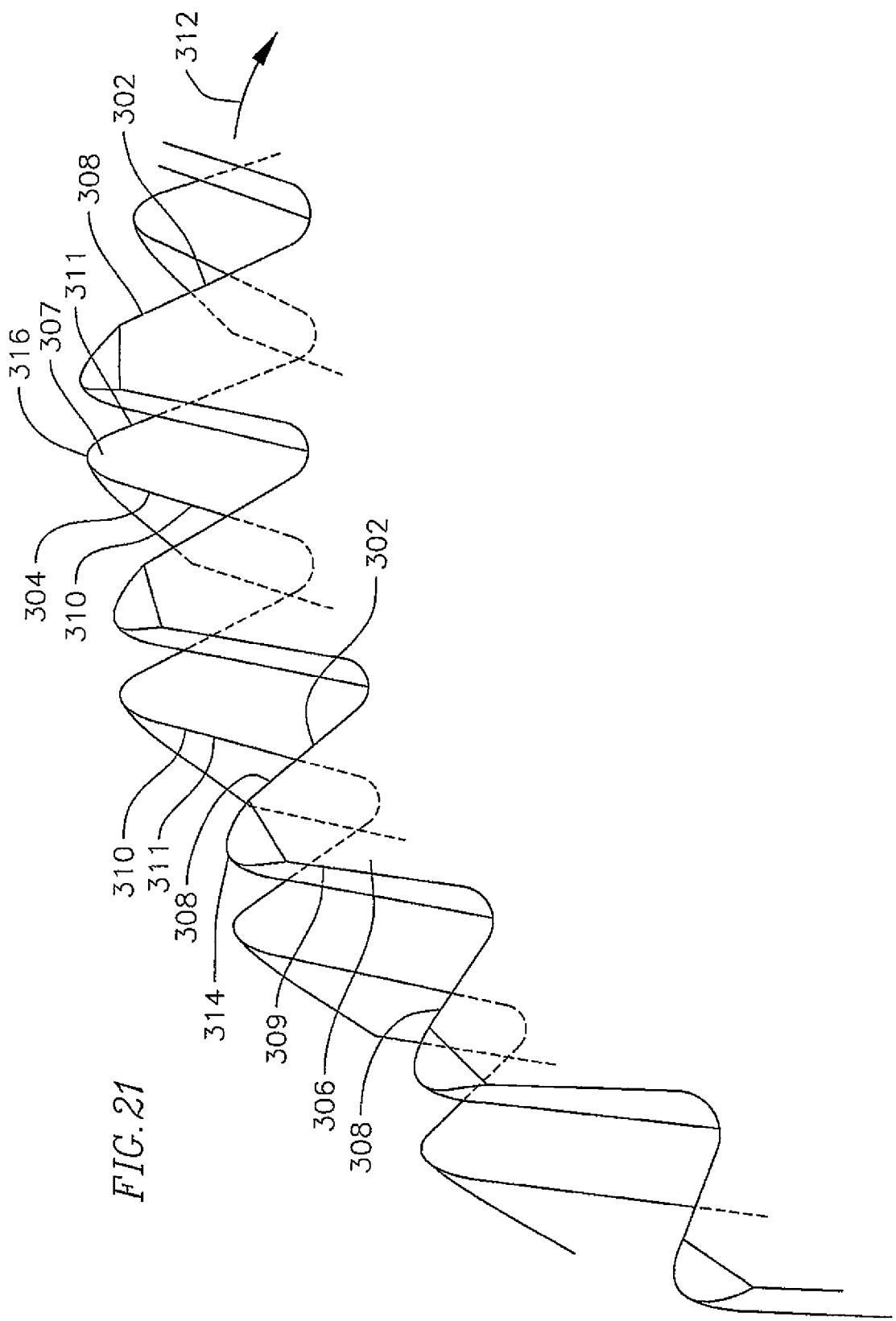
FIG. 21 is a partial plan view of the serrations of example embodiment rotary and stationary disks.

In example embodiments, both the rotary disk and the stationary disk have serrated cutting edges 302, 304 as for example shown in FIG. 21. In an example embodiment, the serrated edges are defined by triangular projections or serrations 306, 307, respectively. In example embodiments the serrations of the rotary cutting disk have opposite sides or edges 308, 309 and the stationary disk serration have opposite edges 310, 311. In an example embodiment the edges 308 of the rotary cutting disk serrations leading in the direction of rotation 312 of the rotary disk are sharp defining the cutting edge 302 as are the edges 310 of the stationary disk serrations defining the cutting edge 302 which face opposite the direction of rotation 312 of the rotary disk. In this regard as the rotary disk rotates along arrow 312, the sharp edge 308 of each rotary disk serration in combination with a sharp edge 310 of a stationary disk serration act like scissors, as for example shown in FIG. 21. In example embodiments both edges 308, 309 of the rotary disk serrations are sharp. In further example embodiment both sides 310, 311 of the stationary disk serrations are sharp. In another example embodiment the tip 314 of each rotary disk serration and the tip 316 of each stationary disk serration is rounded or dull. In this regard, it is more difficult, and sometimes not possible, for the tips of the serrations to punch holes into the hide of the animal being dehided. Hides with holes in them have decreased value.

Thus, the dehider avoids the use of prior art contra-oscillating blades and the related eccentric-driven pushrods which have caused vibration problems and related work place health problems such as carpal tunnels in the past. The dehider of this invention produces an effective scissor-like cutting action without the vibration problems; and the dehider has fewer parts, is lighter in weight, and lowers repair and operating costs.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. For example, other types of motors or drive mechanism may be used to drive the rotary cutting disk. Additionally, as used herein, the term "substantially" and similar terms are used as terms of approximation and not as terms of degree, and are intended to account for the inherent deviations in measured or calculated values that would be recognized by those of ordinary skill in the art. Furthermore, as used herein, when a component is referred to as being "on" or "coupled to" another component, it can be directly on or attached to the other component or intervening components may be present there between.

What is claimed is:

1. A handheld dehider tool comprising:
    an elongated handle;
    a rotary cutting disk having an outer cutting edge and a stationary disk having an outer edge coupled side-by-side on said handle, said rotary cutting disk having an inner surface opposite an outer surface, said stationary disk having an inner surface opposite an outer surface, said inner surface of said rotary cutting disk facing toward the inner surface of the stationary disk, said rotary cutting disk being rotatable about an axis;
    a first gear extending from the inner surface of the rotary cutting disk;
    a drive member coupled to the first gear to drive the rotary disk to rotate about the axis in response to power transmitted to the drive member;
    the stationary disk mounted in at least a substantially fixed position adjacent the rotary disk so that the outer edges of the two disks are closely spaced in a face-to-face relation for producing a shearing and cutting action when the cutting edge of the rotary disk is driven relative to the edge of the stationary disk.

2. The dehider tool according to claim 1, in which the power is supplied by an air motor contained within the handle.

3. The dehider tool according to claim 2, including a speed governor connected between an air inlet and the air motor, the speed governor automatically controlling the flow of air under pressure from the air inlet to the motor to maintain a desired rotational speed of the motor.

4. The dehider tool according to claim 1, in which the power is supplied by an electric motor coupled to the drive member.

5. The dehider tool according to claim 1, wherein the first gear is a ring or a bevel gear.

6. The dehider tool according to claim 5, wherein the drive member comprises a pinion gear coupled to the first gear.

7. The dehider tool according to claim 1, wherein at least part of the drive member penetrates the stationary disk.

8. The dehider tool according to claim 7, wherein at least part of said pinion gear penetrates a cutout on said stationary disk.

9. The dehider tool according to claim 1, further comprising:
    an end section extending from the handle; and
    a shaft extending from the end section along said axis, wherein said rotary cutting disk is rotatable about said shaft.

10. The dehider tool according to claim 9, wherein the shaft extends from said end section and penetrates said stationary and rotary cutting disks.

11. The dehider tool according to claim 9, wherein the shaft is defined by a shaft assembly comprising a cutting edge spacer, a grease fitting and a cover lock fastener.

12. The dehider tool according to claim 11, wherein the grease fitting extends along the axis and defines at least a portion of a shaft along said axis.

13. The dehider tool according to claim 1, further comprising a grease fitting for providing grease between the inner surface of the rotary disk and the inner surface of the stationary disk.

14. The dehider tool according to claim 9, further comprising a cutting edge cover wherein the stationary and rotary cutting disks are sandwiched between the end section and the cutting edge cover.

15. The dehider tool according to claim 1, wherein the stationary disk edge is not as sharp as the rotary disk cutting edge.

16. The dehider tool according to claim 1, wherein the cutting edge of the rotary cutting disk and the edge of the stationary disk are both serrated cutting edges.

17. The dehider tool according to claim 16, wherein each of said serrated cutting edges comprises a plurality of serrations, wherein each serration of said plurality of serrations comprises a blunt tip and at least one cutting edge extending therefrom.

18. A handheld dehider tool comprising:
    an elongated handle;
    a rotary cutting disk being rotatable about an axis and a stationary disk coupled side-by-side on said handle defining a space between said rotary cutting disk and said stationary disk;
    a drive member coupled to the handle and the rotary disk about the axis to drive the rotary disk to rotate about an axis in response to power transmitted to the drive member;
    a grease fitting to provide grease along the axis to said space;
    the stationary disk mounted in at least a substantially fixed position adjacent the rotary disk so that outer edges of the two disks are closely spaced in a face-to-face relation for producing a shearing and cutting action when the cutting edge of the rotary disk is driven relative to the edge of the stationary disk.

19. The dehider tool according to claim 18, wherein said grease fitting defines at least a portion of a shaft along said axis.

* * * * *

UNITED STATES PATENT AND TRADEMARK OFFICE
CERTIFICATE OF CORRECTION

| | |
|---|---|
| PATENT NO. | : 9,615,588 B2 |
| APPLICATION NO. | : 14/505419 |
| DATED | : April 11, 2017 |
| INVENTOR(S) | : Ralph K. Karubian |

It is certified that error appears in the above-identified patent and that said Letters Patent is hereby corrected as shown below:

In the Claims

Column 10, Line 13, Claim 8      Delete "7",
Insert --6--

Signed and Sealed this
Seventeenth Day of April, 2018

Andrei Iancu
*Director of the United States Patent and Trademark Office*